(12) United States Patent
Enright

(10) Patent No.: US 7,243,562 B2
(45) Date of Patent: Jul. 17, 2007

(54) SERVO MOTOR WITH LINEAR OUTPUT

(75) Inventor: Christopher Milner Enright, 21 Harwick Ct., Ladera Ranch, CA (US) 92694

(73) Assignee: Christopher Milner Enright, Ladera Ranch, CA (US)

( * ) Notice: Subject to any disclaimer, the term of this patent is extended or adjusted under 35 U.S.C. 154(b) by 0 days.

(21) Appl. No.: 11/374,698

(22) Filed: Mar. 13, 2006

(65) Prior Publication Data

US 2006/0169071 A1 Aug. 3, 2006

Related U.S. Application Data

(63) Continuation of application No. 10/444,472, filed on May 27, 2003, now abandoned.

(51) Int. Cl.
*F16H 19/00* (2006.01)

(52) U.S. Cl. ........................................ 74/89.22; 74/89.2

(58) Field of Classification Search ................. 74/89.2, 74/89.21, 89.22, 99 R, 100.2, 108, 434; 116/282
See application file for complete search history.

(56) References Cited

U.S. PATENT DOCUMENTS

| | | | | |
|---|---|---|---|---|
| 997,648 A | * | 7/1911 | Cavanagh | ..................... 33/774 |
| 2,417,114 A | * | 3/1947 | Kilham | ........................ 116/282 |
| 4,161,004 A | * | 7/1979 | Dalziel | ........................ 360/267 |
| 4,198,871 A | * | 4/1980 | Dunn et al. | ..................... 74/37 |
| 4,697,467 A | * | 10/1987 | Ando | ........................ 74/89.2 |
| 4,837,650 A | * | 6/1989 | Kawada | ....................... 360/267 |

FOREIGN PATENT DOCUMENTS

JP 5-65947 * 3/1993

* cited by examiner

*Primary Examiner*—William C. Joyce

(57) ABSTRACT

A rotary to linear converter in a remotely controlled toy environment for translating the bidirectional rotation of a servo motor into the linear displacement of a tab connection point. A single spool member which is driven to rotate incrementally from one angular position to another, and a flexible, nonstretchable linkage, which is integral to the spool at one end and integral to a tab at the opposite end. During the period of rotation of the servo motor-driven spool, the integral linkage is either fed off the spool or wound onto the spool thereby traversing the linkage and the integral tab through guides in the housing and lid, which act as alignment restraints tensioning the linkage and tab to eliminate slack.

6 Claims, 5 Drawing Sheets

ROTATION ABOUT AXIS 27

SERVO MOTOR WITH LINEAR OUTPUT

RELATED APPLICATIONS

This application is a continuing application claiming priority to U.S. patent application Ser. No. 10/444,472 filed on May 27, 2003 now abandoned.

FIELD OF THE INVENTION

The present invention relates generally to servo motors, and more specifically to a servo motor with linear output.

BACKGROUND OF THE INVENTION

Servo motors are widely used in the field of motion control in such areas, but not limited to, radio-controlled models, pan tilt units, factory automation, mobile robotics, and walking robots. In particular, servo motors have been employed to manipulate bodies including automobiles, motor boats, airplanes, helicopters, or the like, by controlling their position, speed, or force, among other parameters of motion. In some cases, the servo motors are controlled by wireless means, as is often with models used by hobbyists.

Typically, output from a servo motor is coupled to an arm, sometimes called a "horn", which rotates about an axis of the servo motor output shaft. Thus, output from such servo motors is rotational even though common applications require only translational motion in one direction. Attempts have been made to capture rotational motion into a linear actuation using servo horns, but there remains room for improvement.

Accordingly, it is desirable to provide a method and apparatus that provides a servo motor that offers linear output to control motion according to the desired position by the operator.

SUMMARY OF THE INVENTION

For the purpose of summarizing the invention certain objects and advantages have been described herein. It is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The foregoing needs are met, to some extent, by the present invention, wherein in some embodiments a servo motor is provided that allows translation of rotational motion into linear motion. In accordance with one embodiment of the present invention, the servo motor includes a drum assembly having a drum spool and a linkage operably coupled to the drum spool by a coupling means. The coupling means may be a hinging means to allow movement or rotation about the spool. In yet another embodiment, the drum spool and the linkage may comprise a single unit integrally formed from a single piece of material such as plastic formed by injection molding or similar process so as to be formed together in a continuous, seamless, uninterrupted fashion.

The linkage is preferably flexible and constructed of a plastic material so as to be capable of rotating or moving about the drum spool. Other suitable materials for construction of the linkage and/or drum spool include metal or rubber. In other embodiments, the plastic used for the linkage is a thermoplastic.

The linkage may also include a tab portion, positioned at one end, extending outward, and perpendicular to the linkage. The drum spool may further include a spline designed to operate with the servo motor in some embodiments. Servo motors of the present invention may also include a housing to house the drum spool. Such housings may include a lid comprising a slot to provide guides for the tab.

In yet other embodiments, a method of translating rotational motion into linear motion is provided, comprising a drum spool, a linkage; and a coupling means to operably couple the linkage to the drum spool. The method may further comprise a tab, wherein the tab is positioned at one end, extending outward and perpendicular to the linkage and spline of the drum spool is designed to operate with the servo motor. The method may further comprise a housing to house the spool.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These and other embodiments will become readily apparent to those skilled in the art from the following detailed description of the preferred embodiments having reference to the attached figures, the invention not being limited to any particular preferred embodiment(s) disclosed.

DETAILED DESCRIPTION

Figure 1:
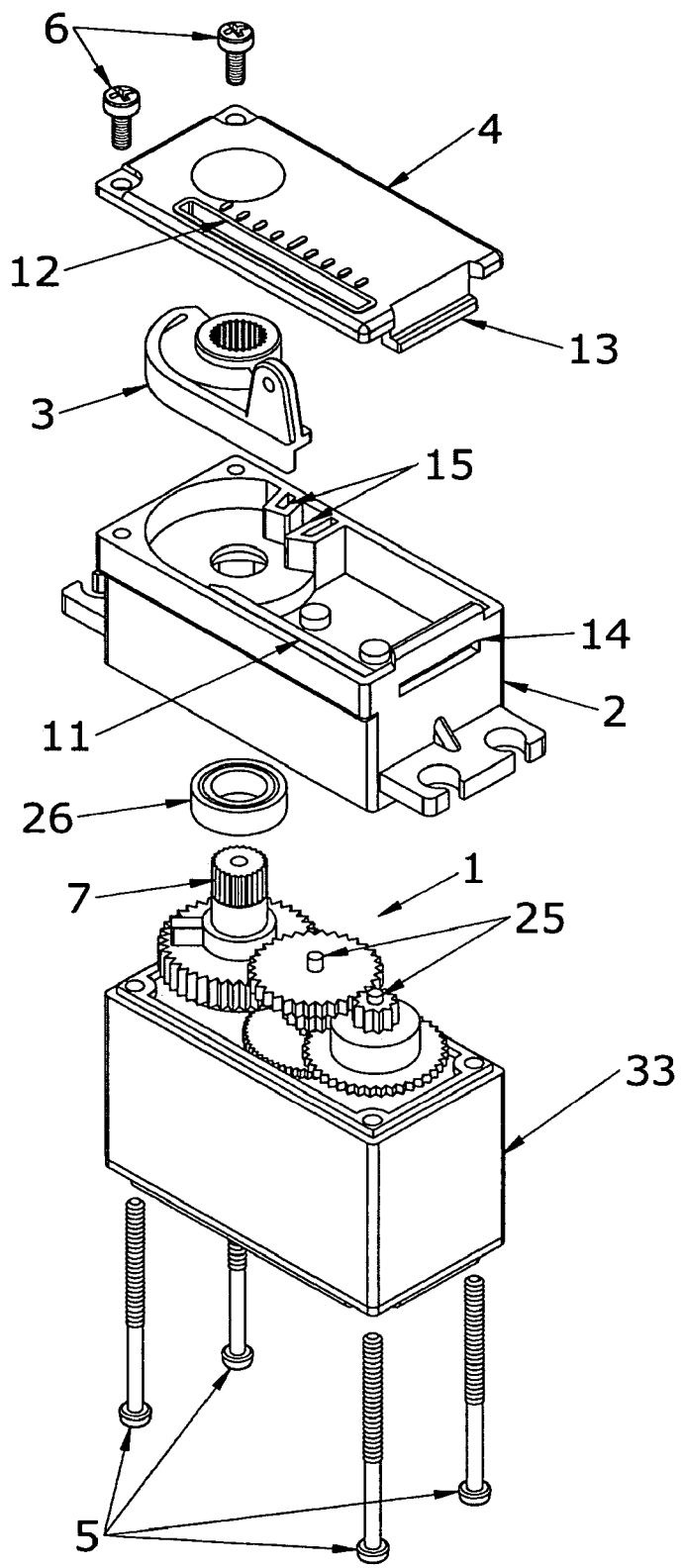
FIG. 1 is an exploded view from the top illustrating a servo motor according to one embodiment of the invention.

Embodiments of the present invention will now be described with references to the accompanying Figures, wherein like reference numerals refer to like elements throughout. The terminology used in the description presented herein is not intended to be interpreted in any limited or restrictive manner, simply because it is being utilized in conjunction with a detailed description of certain embodiments of the invention. Furthermore, various embodiments of the invention (whether or not specifically described herein) may include novel features, no single one of which is solely responsible for its desirable attributes or which is essential to practicing the invention herein described.

The invention will now be described with reference to the drawing figures, in which like reference numerals refer to like parts throughout. An embodiment in accordance with the present invention provides a servo motor with linear output, by employing a drum assembly having a drum spool and a linkage to translate rotational motion into linear motion. The drum assembly is positioned in a customized housing designed to fit servo motors. This apparatus additionally provides the user with a method of linearizing the output from a standard servo motor with rotational output.

Servo motors of the instant invention may be designed as original manufacture components or as a retrofit for existing servo motors available in the art. Therefore, what follows is a description of one embodiment of a servo of the instant invention. It will be apparent to one of ordinary skill in the art from the teachings herein that modifications in some or all of the parameters described below may be required depending on the particular servo, but that all such modifications fall within the scope and spirit of the invention.

FIG. 1 shows one embodiment of a servo motor 1 disposed within a servo motor housing 33. The servo motor 1 includes an output shaft 7 having rotation about a rotational axis 27. The output shaft 7 is used to transmit torque generated by the servo motor 1 to a drum assembly 3 through a drum spline 23. A linear servo housing 2 is screwed or otherwise connected or joined to the servo motor housing 33 with a plurality of servo motor screws 5 or similar type connecting device. The linear servo housing 2 is designed to accommodate gear train shafts 25 arising from the servo motor 1, as well as a drum assembly 3 within the servo motor housing 33.

Figure 2:
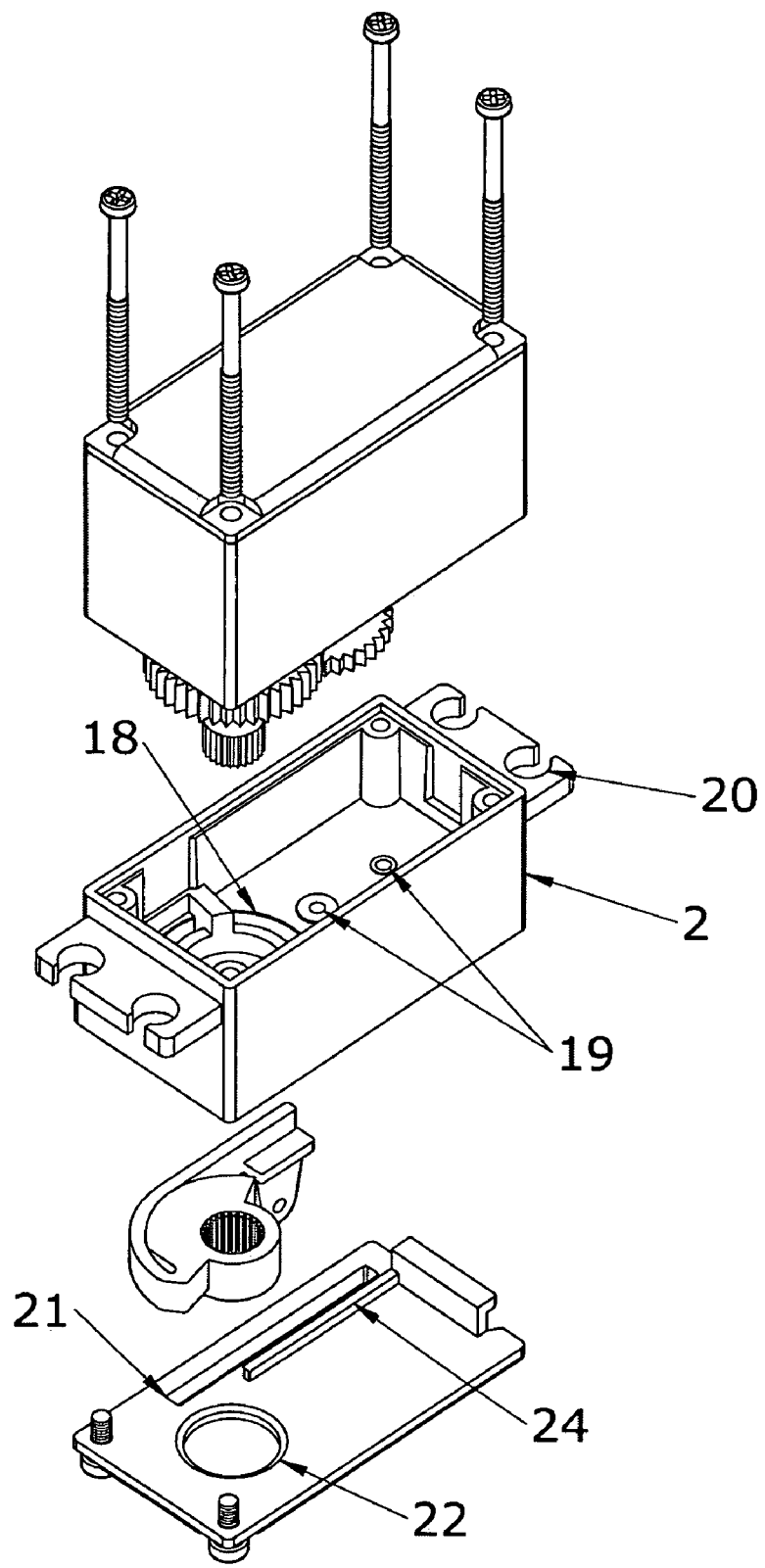
FIG. 2 is an exploded view from the bottom illustrating the servo motor of FIG. 1 according to one embodiment of the invention.

As best illustrated in FIG. 2, the gear train shafts 25 project into gear train blind holes 19 incorporated into the bottom of the linear servo housing 2. As further shown in FIG. 2, the linear servo housing 2 is preferably molded with an indentation or recess 18 to fit a bearing 26 encompassing output shaft 7. Bearing 26 can be a ball bearing or a bushing type design.

Referring back to FIG. 1, output shaft 7 is operably connected or otherwise associated with a drum spline 23 to transfer torque generated from the servo motor 1 to the drum assembly 3. As will be evident from the teachings herein, the drum spline 23 can be modified to accommodate a different output shaft from a variety of servo motors. A drum pilot bearing locator 8 is preferably inserted into a top pilot locator hole 22 in a linear servo housing top plate 4. The linear servo housing top plate 4 is fastened to the linear servo housing 2 preferably using a plurality of top screws 6. For additional restraint, the top plate 4 and the linear servo housing 2 and may be optionally designed with a top retainer clip 13 and a housing clip receptacle 14, respectively.

Figure 3B:
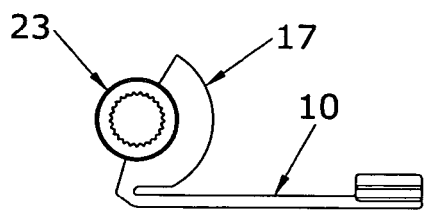
FIGS. 3(*a*)-(*c*) are detailed views of a drum assembly having an integrally formed drum spool and linkage formed from a single, continuous, uninterrupted piece of material in accordance with one embodiment of the invention.
Figure 3C:
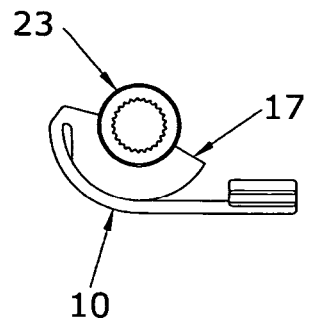

Torque generated by the servo motor 1 rotates a drum spool 17, connected or otherwise operatively associated with the drum spline 23, back and forth in a direction corresponding to the rotation of the output shaft 7. As shown in FIGS. 3(b)-(c), rotation of the drum spool 17 about the output shaft 7 includes an angle of about 60° to about 150°. In other embodiments the angle of rotation may range from about 60° to 120°. When the drum spool 17 is rotated, a linkage 10, extending from and preferably integrally formed with the drum spool 17 so as to form a single continuous uninterrupted piece, is coiled and uncoiled about the drum spool 17.

As indicated above, the linkage 10 may be constructed of any resilient material, including, but not limited to, plastic, metal, or rubber, to allow for bending of the linkage 10 around drum spool 17. As this occurs, a drum tab 9, positioned at one end of the linkage 10 and extending perpendicular to the linkage 10 traverses back and forth within a housing guide 11 which is designed into housing 2 and top guide 24 and top guide slot 21 which are designed into top 4. The guides 11, 24 and guide slot 21 function as restraints which permit the drum tab 9 to traverse back and forth tangent to the drum spool 17 and substantially parallel to the manipulated body's desired direction of motion. During operation, a graduated position scale 12 visually shows the position the drum tab 9 is in relative to the servo motor output shaft 7 rotational center position. Drum stops 15 block the drum assembly 3 from rotating beyond the desired limits of rotation and binding the linkage 10. The linear servo assembly 1 can be mounted via the mounting ears 20 in any application.

Figure 3A:
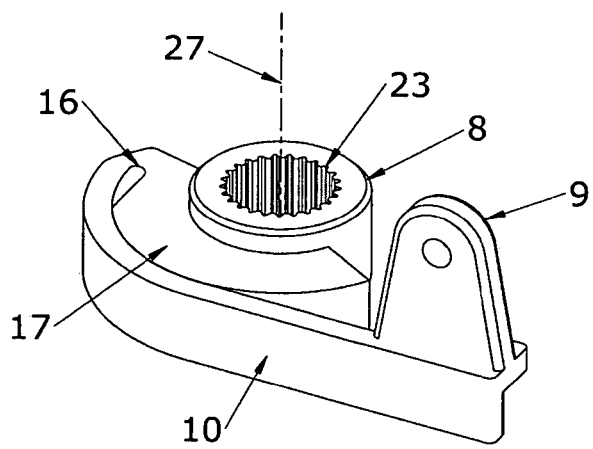

In FIG. 3(a), drum assembly 3 is depicted as a single entity. In other words, linkage 10 and drum spool 17 are preferably injection molded so as to form a single drum assembly unit 3. The linkage extends from the drum spool 17 at extension point 16. The drum assembly 3 is preferably designed with flexible materials, such as plastic, to allow sufficient pliability at the extension point 16 to partially relieve the fatigue stress created by the cyclic motion of the drum spool 17.

Figure 4:
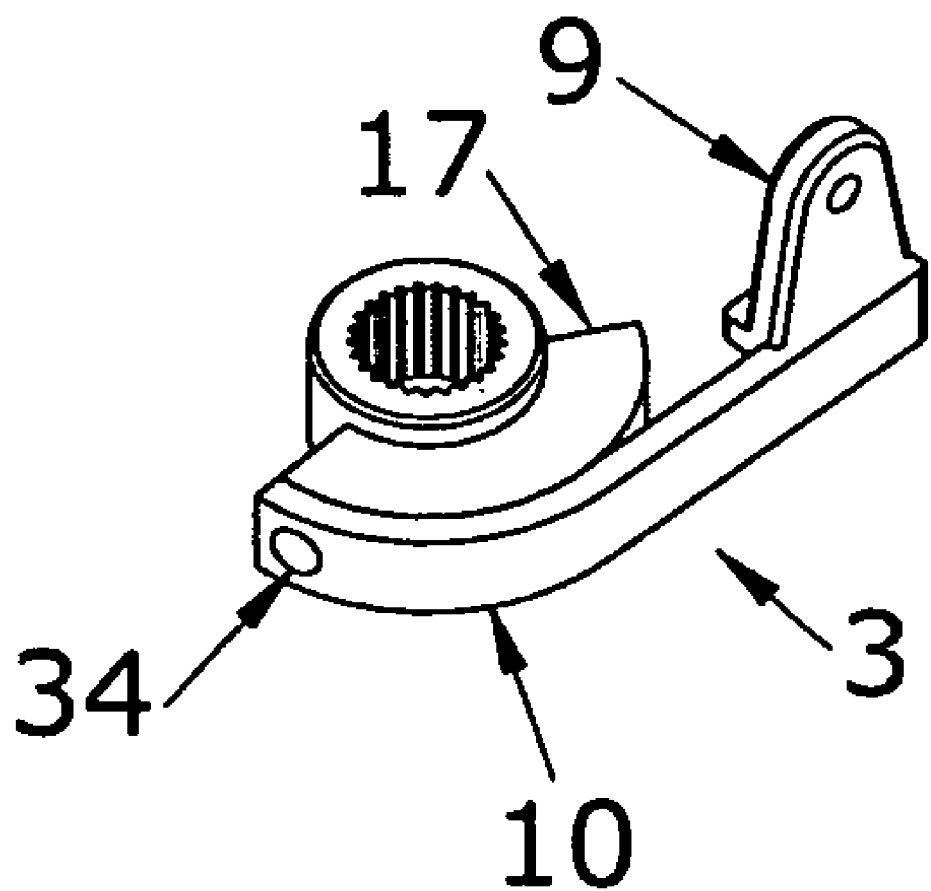
FIG. 4 shows an alternative embodiment of a drum assembly having a coupling means such as a pin for operatively connecting the drum spool to the linkage.

In other embodiments, as shown in FIG. 4, a coupling means 34, such as a pin mechanism, may be employed to connect the linkage 10 and the drum spool 17. It will be appreciated by those of ordinary skill in the art from the teachings herein, that other flexible or rotational connections may be used to provide a flexible connection as desired.

Figure 5B:
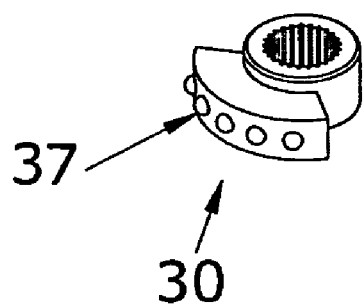
FIGS. 5(a)-(c) show still another embodiment of a drum assembly having a coupling means such as a sprocket type configuration for operatively connecting the drum spool to the linkage.
Figure 5C:
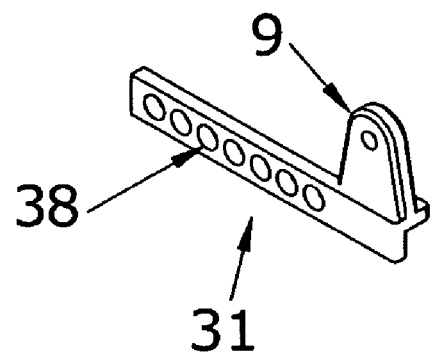
Figure 5A:
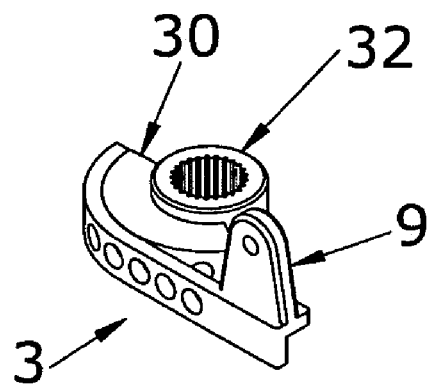

FIGS. 5(a)-(c) show another embodiment of the instant invention, wherein the drum assembly 3 is composed of two pieces, a sprocket drive spool 30, having a plurality of protrusions, gears, or teeth 37 extending thereform, and a linkage 31 having corresponding sockets or grooves 38 for receiving the teeth 37. The sprocket drive spool 30 can transfer the rotational motion to the chain like linkage 31 when assembled into the drum spline 32. The male 30 and female 31 mating type design, as shown, is but one embodiment of other means to transfer rotational motion from the spools 17, 30 to the linkages 10, 31.

Without being bound by or limited to theory, generally, the servos of the present invention use a drum to coil and uncoil the linkage at a fixed radius to achieve linearity. The drum tab 9 is confined in 2 of the 3 translational degrees of freedom and is also confined in all 3 rotational degrees of freedom. This allows traverse movement in one translational degree of freedom that is tangent to the outer radius of the drum spool 17, 30.

The drum assembly 3 may be manufactured with materials known in the art, including plastics. In some embodiments, a co-polymeric polypropylene thermoplastic, such as Huntsman P5M5K-047, may be used. Desirable plastics can have high tensile strength and fatigue resistance properties. High tensile strength may be greater than about 4000 psi tested to over 1,000,000 cycles. In some embodiments, the linear servo housing 2 may be manufactured using a high grade engineered resin such as Polycarbonate ABS blend, Cycoloy C1000HF.

The many features and advantages of the invention are apparent from the detailed specification, and thus, it is intended by the appended claims to cover all such features and advantages of the invention, which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

Although the method of the present invention is illustrated herein with steps occurring in a certain order, the specific order of the steps, or any continuation or interruption between steps, is not required.

The apparatus and methods of the present invention have been described with some particularity, but the specific designs, constructions and steps disclosed are not to be taken as delimiting of the invention. Obvious modifications will make themselves apparent to those of ordinary skill in the art, all of which will not depart from the essence of the invention and all such changes and modifications are intended to be encompassed within the appended claims.

What is claimed is:

1. A servo motor, comprising:
   a drum spool; and
   a linkage coupled at one end to the drum spool by a coupling means and capable of being wound about the drum spool; and
   a tab positioned at the other end of the linkage, extending perpendicular therefrom, and operably coupled to the linkage; and
   wherein the drum spool, the linkage, and the tab are integrally formed from a single piece of material.

2. The servo motor of claim 1, wherein the linkage is flexible.

3. The servo motor of claim 1, wherein the single piece of material is plastic.

4. The servo motor of claim 1, wherein the coupling means is flexible.

5. The servo motor of claim 1, further comprising a housing to house the drum spool, the housing having a lid.

6. The servo motor of claim 5, wherein the housing and lid comprise slots providing guides for the linkage and the tab.

* * * * *